United States Patent [19]

Haim et al.

[11] Patent Number: 4,950,053
[45] Date of Patent: Aug. 21, 1990

[54] MULTIBEND FLUORESCENT LIGHT SOURCE FOR LIQUID CRYSTAL DISPLAYS WITH OUT OF PLANE LAMP ELECTRODES

[75] Inventors: Elias S. Haim, Windham, N.H.; Francis L. Leard, Sudbury, Mass.

[73] Assignee: General Electric Company, Schenectady, N.Y.

[21] Appl. No.: 339

[22] Filed: Jan. 5, 1987

[51] Int. Cl.⁵ .............................. G02F 1/13; F21V 7/04
[52] U.S. Cl. ................................... 350/345; 362/31; 362/84; 350/334
[58] Field of Search ................... 350/334, 345; 362/31, 362/33, 84

[56] References Cited

U.S. PATENT DOCUMENTS

| | | | |
|---|---|---|---|
| 1,680,633 | 8/1928 | Peters | 362/84 |
| 4,330,813 | 5/1982 | Deutsch | 350/345 |
| 4,664,481 | 5/1987 | Ito et al. | 350/345 |
| 4,748,546 | 5/1988 | Ukrainsky | 350/345 |
| 4,767,193 | 8/1988 | Ota et al. | 350/345 |
| 4,770,499 | 9/1988 | Kobayashi et al. | 350/345 |

OTHER PUBLICATIONS

Voltarc, Inc., "Voltarc Custom Fluorescent Lamps", Voltarc's Technical Bulletin, 1987.
Voltarc, Inc., "Unmatched Innovation and Quality", Information Display 1, vol. 5, No. 9, May 1989.

*Primary Examiner*—Stanley D. Miller
*Assistant Examiner*—Huy K. Mai
*Attorney, Agent, or Firm*—Robert A. Cahill

[57] ABSTRACT

A fluorescent light source for backlighting a liquid crystal panel display consists of one or more u-shaped fluorescent elements in which the portion of the lamp segments containing the electrodes are bent at right angles to the principal light emitting portion. The low light emitting area in the vicinity of the electrodes is thus moved out of the light emitting area resulting in uniform light emission over the entire active area of the light source.

The instant invention relates to a light source for a liquid crystal display and, more particularly, a light source utilizing fluorescent elements in which the low level emissions in the vicinity of the electrode portions of the lamp are kept out of the light emitting plane.

6 Claims, 1 Drawing Sheet

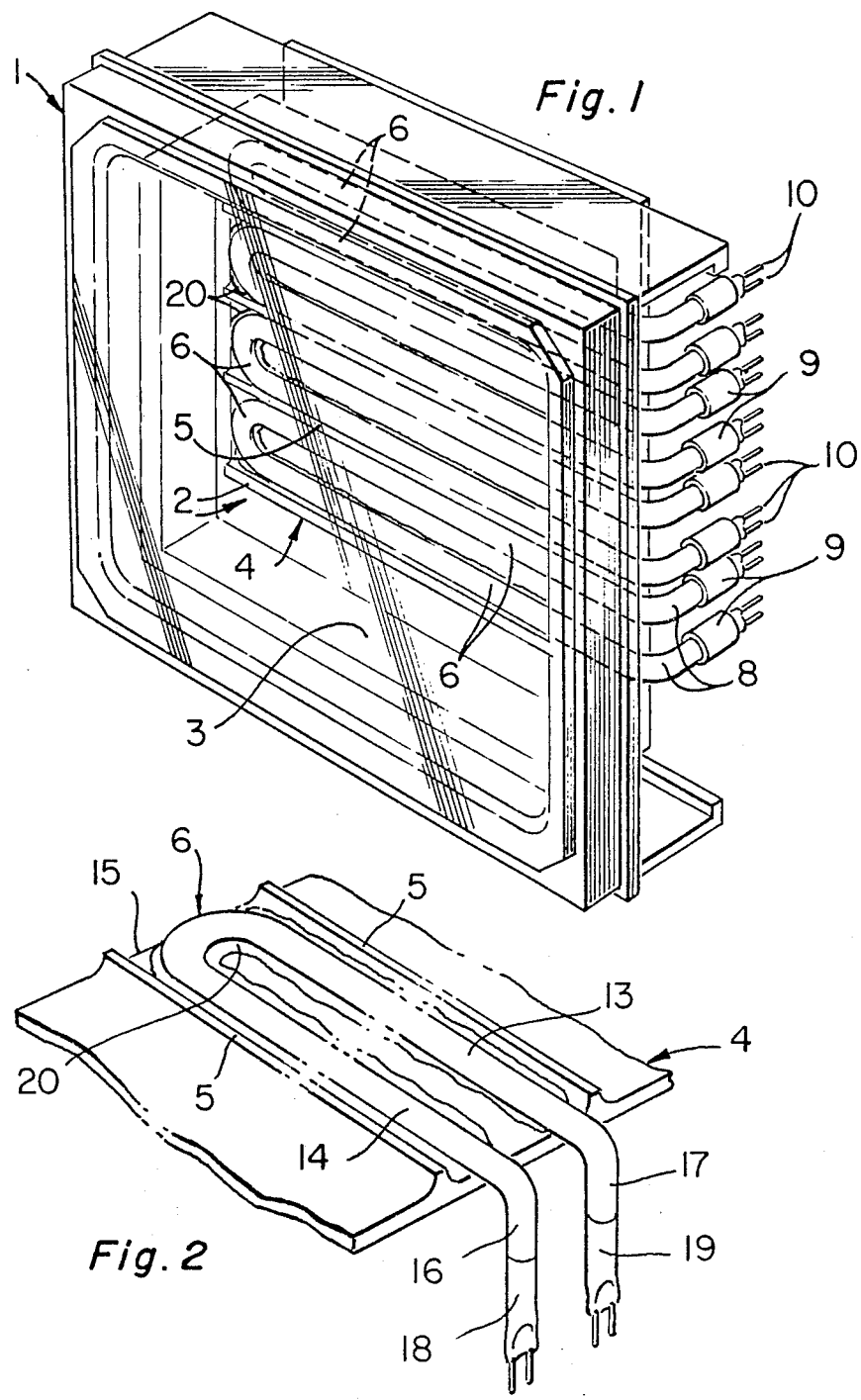

MULTIBEND FLUORESCENT LIGHT SOURCE FOR LIQUID CRYSTAL DISPLAYS WITH OUT OF PLANE LAMP ELECTRODES

BACKGROUND THE INVENTION

Fluorescent lamps are highly useful as light sources for backlighting flat panel liquid crystal display because of their high light emission levels, their high efficiency and because the spectral characteristics of the emitted light can be readily controlled. In the past, fluorescent light sources for flat panel liquid crystal displays typically consisted of parallel arrays of elongated fluorescent lamps mounted on a support element and positioned behind the display.

In backlighting flat panel liquid crystal displays, the active area of the display must be uniformly illuminated by the lighting source. In addition, in many applications as for example in aircraft cockpit displays where space is at a premium, the display panel must be as small as practical; i.e., the non-active border of the panel should be minimized. Fluorescent lamps with all their advantages of high light output and high efficiencies, etc., do have one shortcoming with respect to such applications because the light output in the vicinity of the lamp electrodes is low. That is, the relatively dark area between the tip of the lamp and the point where phosphor excitation takes place may be more than an inch long. In a 4×4 or 6×6 inch display this represents a substantial area in which a light output is much lower than the output from the main portion of the light source, thus severely eroding the uniformity of the light illuminating the liquid crystal display.

In attempts to overcome the non-uniformity display problem, displays have been made where the area of low light emission adjacent to the electrodes are located in the border or inactive area of liquid crystal display. This, however, increases the border area and the overall size of the flat panel display for a given active display area. This, as pointed out above, is undesirable in those applications where space is at a premmium and where the flat panel display must have minimal border area.

Applicant has found that a fluorescent light source for liquid crystal displays with high uniformity, may be realized by providing a fluorescent lamp having the portions containing the electrodes bent out of the plane of the principal light emitting portion of the fluorescent lamp. As a result, the relatively dark portion of the lamp in the vicinity of the electrodes is not in the light emitting plane which illuminates the liquid crystal display. Furthermore, by bending the electrode containing portions of the lamp out of the plane of light emission, the non-active border area of the liquid crystal display is minimized.

In addition to bending the electrode containing lamp portions out of the plane of light emission, it is also desirable to have the main portion of the fluorescent lamp bent back on itself in a u-shaped configuration to increase the length of light-emitting portion of the lamp for each pair of electrodes. This improves efficiency of the flurorescent lamp by eliminating the $I^2r$ losses associated with the extra pair of electrodes needed if simply two elongated fluoresent lamps are used. That is, for a 4×4 liquid crystal display, for example, a u-shaped fluorescent having two legs each four (4) inches long gives a total light emitting length of eight (8) inches. If two linear four (4) inch fluorscent tubes are used, four electrodes are necessary thereby doubling the $I^2r$ losses without increasing the light emission. Thus, a combination of a three-bend fluorescent light source, with two of the bends bringing the electrodes out of the plane of light emission and one bend to form the u-shape and other bend-back configuration, provides substantial advantages in terms of efficiency and uniformity of lighting.

It is therefore a principal objective of the instant invention to provide a fluorescent light source for a liquid crystal display which provides uniform illumination of the display while minimizing the overall size thereof.

Yet another objective of the invention is to provide a light source for a Liquid Crystal Display in which the electrodes of the fluorescent light are out of the plane of the light-emitting portion of the lamp.

Still another objective of the invention is to provide a fluorescent illumination source for liquid crystal display in which the number of fluorescent lamp electrodes are minimized.

Still other objectives and advantages of the invention will become apparent as the description thereof proceeds.

BRIEF DESCRIPTION OF THE INVENTION

The objectives and advantages of the invention are realized in a light source for a flat panel liquid crystal display in which an array of u-shaped fluorescent lamps constitute the light source for backlighting the display. The portion of the u-shaped fluorescent lamps containing the electrodes are bent at right angles to the u-shaped portion, thus removing the lamp electrodes from the principal light emitting plane of the lamp array thereby enhancing uniformity of the illumination for the display without increasing the inactive border area of the display. Furthermore, by utilizing a u-shape the length of the fluorescent tube per electrode pair is increased thereby increasing the efficiency of each lamp element by reducing the $I^2r$ losses. associated with the electrodes for a given length of lamp.

BRIEF DESCRIPTION OF DRAWINGS

FIG. 1 is a perspective of the lighting assembly and housing showing the three-bend fluorescent light elements.

FIG. 2 is the perspective view of the individual u-shaped, three-bend fluorescent element of the invention.

DETAILED DESCRIPTION OF THE INVENTION

FIG. 1 is the perspective view of the light source which provides backlighting for a flat panel liquid display. FIG. 1 shows a bezel or housing 1 having an opening 2 in which a flat panel liquid display, not shown, is mounted for viewing. Secured in bezel 1 is a light assembly mounting frame 3 to which a lamp mounting board 4 is secured. board 4 contains a plurality of lamp cradles defined by ridges 5 for securing a plurality of u-shaped fluorescent lamps. Extending at right angles from the u-shaped planar portion of each fluorescent lamp are a pair of leg portions 8. containing the lamp electrodes 8. Insulating sleeves 9 surround the ends of lamp legs 8 and leads 10 output 11 extends from each of the electrode elements of the lamp and are connected to an energizing source, not shown, for exciting the lamps in the array.

FIG. 2 shows a perspective view of an individual three-bend fluorescent lamp support on mounting board 4. Thus FIG. 2 shows a three-bend fluorescent light element consisting of a u-shaped portion having two parallel legs 13 and 14 joined by a circular bend portion 15. The u-shaped portion of the fluoresent lamp essentially defines the plane of light illumination from that fluorescent lamp. Ends of the legs 13 and 14 are bent at right angles to form out of plane leg sections 16 and 17 which contain the lamp electrodes. The low illumination portions in the vicinity of electrodes as illustrated at 18 and 19, are thus out of the plane in which the principal light illuminating elements 13, 14, and 15 of the fluorescent lamps are contained. This, as pointed out above, results in essential uniform illumination from the lamp in the plane containing the lamp portions 13, 14, and 15 while reducing the overall width of the fluorescent lamp assembly by moving the portions containing the electrodes out of the illuminating plane. The lamp is supported on a board 4 in a cradle formed by ridges 5 extending the width of the board and parallel to legs 14 and 15. The lamp is secured to the board by a strip of adhesive 20 which may be an epoxy, a silicone or any other adhesive compatible with the board and lamp glass.

In the exemplary illumination source shown in FIG. 1 four (4) u-shaped, three-bend fluorescent lamp elements are shown so that there are eight (8) elongated light elements which extend across the width of the opening in the bezel. The four (4) u-shaped, fluorescent lamps, which provide eight (8) elongated light elements, contain eight electrode elements, i.e., two for each u-shaped lamp. In a conventional arrangement using straight fluorescent tubes, eight (8) individual tubes would be required to provide the same level of illumination. In such a case, the eight tubes with two electrodes per tube results in a system with 16 electrodes; i.e., double the number of electrodes required with the u-shaped lamps. This, of course, doubles the $I^2r$ losses associated with the fluorescent lamp electrodes. Hence, it is clear that by utilizing the doubled back u-shape the overall efficiency of the lighting arrangement is substantially enhanced by eliminating half the electrode elements and the $I^2r$ losses associated with these elements.

Bending the portions of the lamp containing the lamp electrodes out of the principal light emitting plane results in an additional advantage. Since the heat losses in a fluorescent lamp are concentrated in the vicinity of the lamp electrodes, the out of plane location allows the use of small, compact heat sinks directly next to electrodes of the lamp both of which are located adjacent to each other rather than away from each other as is the case with elongated lamps.

It is therefore clearly apparent that the light source of the instant invention provides a substantial improvement both in the uniformity of illumination in the area of liquid crystal display (by moving the area of low illumination in the vicinity of the lamp electrodes out of the plane of illumination) while minimizing inactive border area. Furthermore, the efficiency of the overall illumination system is greatly improved by virtue of the reduction of the total number of electrodes (and their associated $I^2r$ losses) in the fluorescent lamp array for any given level of light output.

While the instant invention has been described in connection with a preferred embodiment thereof and the invention is by no means limited thereto, since other modifications of the instrumentalities employed may be made still into the scope of the invention.

It is contemplated by the appended claims to cover any such modifications as fall within the scope and spirit of this invention.

What we claim as new and deserving protection under U.S. Letters Patent:

1. A liquid crystal display assembly comprising; in combination:
   (a) a housing having a rectangular frontal opening for receiving a liquid crystal display panel;
   (b) a mounting board secured in said housing rearwardly of said frontal opening; and
   (c) a source of back illumination including a plurality of fluorescent lamps affixed to said mounting board in side-by-side relation, each said lamp including a medial portion having an intermediate bend such as to provide a plane of back illumination parallel to said liquid crystal display panel and electrode-containing terminal end portions bent rearwardly out of said back illumination plane.

2. The liquid crystal display assembly defined in claim 1, wherein said electrode-containing terminal end portions are bent at right angles to said back illumination plane.

3. The liquid crystal display assembly defined in claim 1, wherein said intermediate bend is a single 180° bend to provide a U-shaped said medial portion.

4. The liquid crystal display assembly defined in claim 3, wherein said medial portion includes a pair of straight leg sections interconnect by said 180° bend adjacent one end of said liquid crystal display panel and extending in closely spaced parallel relation to adjacent an opposite end of said liquid crystal display panel where said electrode-containing terminal end portions are bent rearwardly out of said back illumination plane.

5. The liquid crystal display assembly defined in claim 4, wherein said electrode containing terminal end portions are bent at right angles to said back illumination plane.

6. The liquid crystal display defined in claim 4, wherein said mounting board includes elongated, forwardly extending cradling ridges separating said straight leg sections of adjacent said fluorescent lamps.

* * * * *